(12) United States Patent
Take

(10) Patent No.: US 12,515,102 B2
(45) Date of Patent: Jan. 6, 2026

(54) INFORMATION PROVIDING SYSTEM AND INFORMATION PROVIDING METHOD

(71) Applicant: dricos, Inc., Tokyo (JP)

(72) Inventor: Yasuhiro Take, Tokyo (JP)

(73) Assignee: dricos, Inc., Tokyo (JP)

( * ) Notice: Subject to any disclaimer, the term of this patent is extended or adjusted under 35 U.S.C. 154(b) by 0 days.

(21) Appl. No.: 18/759,150

(22) Filed: Jun. 28, 2024

(65) Prior Publication Data

US 2025/0010135 A1    Jan. 9, 2025

(30) Foreign Application Priority Data

Jul. 3, 2023    (JP) ................ 2023-109280

(51) Int. Cl.
*A63B 24/00* (2006.01)
*G09B 19/00* (2006.01)
*G16H 20/30* (2018.01)

(52) U.S. Cl.
CPC ......... *A63B 24/0062* (2013.01); *G16H 20/30* (2018.01); *A63B 2024/0068* (2013.01); *G09B 19/00* (2013.01)

(58) Field of Classification Search
None
See application file for complete search history.

(56) References Cited

U.S. PATENT DOCUMENTS

2017/0361156 A1    12/2017    Sugiya

FOREIGN PATENT DOCUMENTS

| JP | 2010-165320 A | 7/2010 |
| JP | 2016-150018 A | 8/2016 |
| JP | 2017-006192 A | 1/2017 |

*Primary Examiner* — James B Hull
(74) *Attorney, Agent, or Firm* — MICHAEL BEST & FRIEDRICH LLP

(57) ABSTRACT

In an information providing system: a first acquisition unit 10 acquires first information relating to a first exercise to be performed by a first user; an assessment unit 16 assesses a degree of correlation between the first information and information stored in a first memory 14A relating to exercises to be performed by other users different from the first user; a second acquisition unit 11 acquires information relating to a second user among the other users who engages in a second exercise assessed by the assessment unit 16 as having a correlation of a certain level or higher with the first information; and a providing unit 19 provides the information relating to the second user acquired by the second acquisition unit 11 in a form understandable to the first user as assistance information for assisting the first user engaging in the first exercise.

20 Claims, 10 Drawing Sheets

FIG. 3

| USER ID | IDENTIFIER | MEMBERSHIP IDENTIFIER |
|---|---|---|
| 1 | U452TSD | QWER001 |
| 2 | R523R4D | ASDF123 |
| 3 | WX566TR | ZXCV456 |

FIG. 4

| FACILITY ID | NAME | ADDRESS |
|---|---|---|
| 1 | SPORTS GYM AAA | XXX, BUNKYO-KU, TOKYO |
| 2 | SPORTS GYM BBB | XXX, KATSUSHIKA-KU, TOKYO |
| 3 | SPORTS GYM CCC | XXX, KAWASAKI-SHI, KANAGAWA |

FIG. 5

| FITNESS DEVICE ID | FACILITY ID | EXERCISE | IDENTIFICATION CODE |
|---|---|---|---|
| 1 | 1 | CHEST PRESS | CHEST-ID001 |
| 2 | 1 | SMITH MACHINE | SMITH-ID001 |
| 3 | 2 | LEG PRESS | LEG-ID001 |

FIG. 6

| USER ID | FITNESS DEVICE ID | FACILITY ID | EXERCISE | IDENTIFICA-TION CODE | TIME |
|---|---|---|---|---|---|
| 1 | 1 | 1 | CHEST PRESS | CHEST-ID001 | 2023/7/1 15:00-15:20 |
| 2 | 4 | 2 | CHEST PRESS | CHEST-ID004 | 2023/6/20 18:00-18:30 |
| 3 | 3 | 3 | LEG PRESS | LEG-ID001 | 2023/6/10 10:00-10:20 |

| USER ID | OBJECTIVE |
|---|---|
| 1 | DIETING |
| 2 | BUILDING MUSCLE STRENGTH |
| 3 | IMPROVING ENDURANCE |

FIG. 8

| USER ID | HEIGHT (cm) | WEIGHT (kg) | SEX | BODY-FAT PERCENTAGE | MUSCLE MASS | AGE | AMOUNT OF CHANGE IN BODY-FAT PERCENTAGE |
|---|---|---|---|---|---|---|---|
| 1 | 160 | 50 | 1 | 23% | 20kg | 35 | 2% |
| 2 | 175 | 70 | 2 | 18% | 30kg | 29 | 1% |
| 3 | 155 | 60 | 1 | 28% | 15kg | 50 | 1% |

| RELATIONSHIP ID | USER ID | USER ID |
|---|---|---|
| 1 | 2 | 1 |
| 2 | 2 | 3 |
| 3 | 3 | 2 |

570

INFORMATION PROVIDING SYSTEM AND INFORMATION PROVIDING METHOD

TECHNICAL FIELD

The present disclosure relates to an information providing system and an information providing method and, in particular, to a technology to assist users engaging in exercise.

BACKGROUND ART

In recent years, with s growing emphasis on health, many users are turning to exercise facilities, such as sports gyms, to help maintain their well-being. However, it is said that the annual retention rate for gym members is around 10%, and what is notable is that many users cancel their memberships shortly after joining.

For example, PTL 1 discloses an exercise assistance system that uses a game application to enhance users' motivation for exercise. This system records the user's physical activities, and when the recorded exercise values, such as step counts, reach a certain threshold, rewards like points are generated.

However, the system disclosed in PTL 1 is designed for each user to enhance their own exercise motivation by utilizing rewards from a game application. Since there is no communication with other users, it remains a matter of individual will to improve exercise motivation.

One effective method for improving gym retention rates is the formation of communities among individuals who are also engaged in training. By solving each other's training methods and problems, obstacles to training can be eliminated, and motivation is maintained through interactions with others.

On the other hand, in recent years, major social networking services (SNS) have also introduced methods for community formation using voice and video. Users can freely enter and exit channels of their interest, where they can communicate with each other through voice and video within those channels.

Users training at exercise facilities such as gyms might consider forming communities easily by logging into the same channels on major social networking services. However, within the environment of a sports gym, it is very cumbersome for users to search for channels that match their specific training needs each time. Moreover, because these platforms are not specifically designed for workout, they lack features for sharing individual workout and physical information, requiring users to communicate individually. As a result, conventional exercise assistance through online platforms has still struggled to effectively enhance users' motivation for exercise.

CITATION LIST

Patent Literature

PTL 1: Japanese Patent Laid-Open No. 2010-165320

SUMMARY OF INVENTION

Technical Problem

As described above, according to the conventional technologies, it is difficult to provide exercise assistance that effectively enhances users' motivation for exercise.

The present disclosure has been made in order to solve the problem described above and an object thereof is to provide exercise assistance to more effectively enhance users' motivation for exercise.

Solution to Problem

In order to solve the problem described above, an information providing system according to the present disclosure includes: a first acquisition unit which acquires first information relating to a first exercise to be performed by a first user; an assessment unit which assesses a degree of correlation between the first information and information, stored in a first memory, relating to exercises to be performed by other users different from the first user; a second acquisition unit which acquires information relating to a second user among the other users who engages in a second exercise assessed by the assessment unit to have a correlation of a certain level or higher with the first information; and a providing unit which provides the information relating to the second user acquired by the second acquisition unit in a form understandable to the first user as assistance information to assist the first user engaging in the first exercise.

Further, the information providing system according to the present disclosure may further include a third acquisition unit which acquires first objective information relating to an objective of the first user of engaging in the first exercise, wherein the assessment unit may assess the degree of correlation between the first information and the information relating to exercises to be performed by the other users in consideration of the first objective information and information, stored in a second memory, relating to objectives of the other users of engaging in the exercises.

Yet further, the information providing system according to the present disclosure may further include a generator which generates an exercise menu to be recommended to the first user in order to achieve the goal of the first user of engaging in the first exercise based on the second exercise having been performed by the second user, wherein the assistance information may include the generated exercise menu.

Yet further, the information providing system according to the present disclosure may further include an analyzer which analyzes, in order to make a relative assessment of the first exercise to be performed by the first user, a history of the second exercise to be performed by the second user stored in the first memory, wherein the assistance information may include a result of the analysis by the analyzer.

Yet further, the information providing system according to the present disclosure may further include an identification unit which identifies facilities at which the first user and the other users each engage in exercises based on the first information and the information relating to exercises to be performed by the other users, wherein the analyzer may analyze a history of exercises to be performed by the other users in order to make a relative assessment of the first exercise to be performed by the first user for each of the facilities at which the first user and the other users each engage in exercises.

Yet further, the information providing system according to the present disclosure may further include a fourth acquisition unit which acquires first physical information that is information relating to the body of the first user, wherein the assessment unit may assess the degree of correlation between the first information and the information relating to exercises to be performed by the other users in consideration of the first physical information and information, stored in a third memory, relating to the bodies of the other users.

Yet further, the information providing system according to the present disclosure may further include a communication controller which establishes communication between a first terminal device associated with the first user and a second terminal device associated with the second user based on information relating to the second user having been acquired by the second acquisition unit.

Yet further, in the information providing system according to the present disclosure, the communication controller may establish a connection between a user account of the first user and a user account of the second user on a predetermined online platform and store the first user and the second user in association with each other in a fourth memory.

Yet further, in the information providing system according to the present disclosure, the first acquisition unit may further acquire first time point information indicating a time point at which the first user is to engage in the first exercise, the first memory may further store time point information on a time point at which each of the other users is to engage in the exercise, and the assessment unit may assess the degree of correlation between the first information and the information relating to exercises to be performed by the other users in consideration of the first time point information and the time point information that is stored in the first memory and that relates to a time point at which each of the other users had engaged in the exercise.

In order to solve the problem described above, an information providing method according to the present disclosure includes: a first step of acquiring first information relating to a first exercise to be performed by a first user; a second step of assessing a degree of correlation between the first information and information, stored in a first memory, relating to exercises to be performed by other users different from the first user; a third step of acquiring information relating to a second user among the other users engaging in a second exercise assessed in the second step to have a correlation of a certain level or higher with the first information; and a fourth step of providing the information relating to the second user acquired in the third step in a form understandable to the first user as assistance information to assist the first user engaging in the first exercise.

Further, the information providing method according to the present disclosure may further include a fifth step of acquiring first goal information relating to an objective of the first user of engaging in the first exercise, wherein in the second step, the degree of correlation between the first information and the information relating to exercises to be performed by the other users may be assessed in consideration of the first objective information and information, stored in a second memory, relating to objectives of the other users of engaging in the exercises.

Yet further, the information providing method according to the present disclosure may further include a sixth step of generating an exercise menu to be recommended to the first user in order for the first user to achieve the objective engaging in the first exercise based on the second exercise performed by the second user, wherein the assistance information may include the generated exercise menu.

Yet further, the information providing method according to the present disclosure may further include a seventh step of analyzing, in order to make a relative assessment of the first exercise to be performed by the first user, a history of the second exercise to be performed by the second user that is stored in the first memory, wherein the assistance information may include a result of the analysis obtained in the seventh step.

Yet further, the information providing method according to the present disclosure may further include an eighth step of identifying facilities at which the first user and the other users each engage in exercises based on the first information and the information relating to exercises to be performed by the other users, wherein in the seventh step, a history of exercises to be performed by the other users may be analyzed in order to make a relative assessment of the first exercise to be performed by the first user for each of the facilities at which the first user and the other users each engage in exercises.

Yet further, the information providing method according to the present disclosure may further include a ninth step of acquiring first physical information that is information relating to the body of the first user, wherein in the second step, the degree of correlation between the first information and the information relating to exercises to be performed by the other users may be assessed in consideration of the first physical information and information, stored in a third memory, relating to the bodies of the other users.

Yet further, the information providing method according to the present disclosure may further include a tenth step of establishing communication between a first terminal device associated with the first user and a second terminal device associated with the second user based on information relating to the second user acquired in the third step.

Yet further, in the information providing method according to the present disclosure, in the tenth step, a connection between a user account of the first user and a user account of the second user on a predetermined online platform may be established and the first user and the second user may be stored in association with each other in a fourth memory.

Yet further, in the information providing method according to the present disclosure, in the first step, first time point information indicating a time point at which the first user is to engage in the first exercise may be further acquired, the first memory may further store time point information on a time point at which each of the other users is to engage in the exercise, and in the second step, the degree of correlation between the first information and the information relating to exercises to be performed by the other users may be assessed in consideration of the first time point information and the time point information, stored in the first memory, relating to a time point at which each of the other users had engaged in the exercise.

Advantageous Effects of Invention

According to the present disclosure, a degree of correlation between information relating to an exercise of a first user and information relating to exercises to be performed by other users is assessed, and information relating to a second user, among the other users, who engages in an exercise having a correlation of a certain level or higher is acquired, and is provided as assistance information to the first user. Thus, exercise assistance that effectively enhances users' motivation for exercise can be provided.

BRIEF DESCRIPTION OF DRAWINGS

FIG. 3 is a diagram showing an example of a configuration of a user information table included in the information providing system according to the present embodiment;

FIG. 4 is a diagram showing an example of a configuration of a facility table included in the information providing system according to the present embodiment;

FIG. 5 is a diagram showing an example of a configuration of a fitness device table included in the information providing system according to the present embodiment;

FIG. 6 is a diagram showing an example of a configuration of an exercise information table included in the information providing system according to the present embodiment;

FIG. 7 is a diagram showing an example of a configuration of an objective information table included in the information providing system according to the present embodiment;

FIG. 8 is a diagram showing an example of a physical information table included in the information providing system according to the present embodiment;

FIG. 9 is a diagram showing an example of a relationship table included in the information providing system according to the present embodiment;

DESCRIPTION OF EMBODIMENT

Hereinafter, a preferred embodiment of the present disclosure will be described in detail with reference to FIGS. 1 to 14.

[Configuration of Information Providing System]

First, an overview of an information providing system according to an embodiment of the present disclosure will be described. The information providing system acquires information relating to a second user who engages in an exercise having a correlation with an exercise to be performed by a first user, and provides the first user with the acquired information as assistance information to assist the first user's engagement in the exercise.

Figure 1:
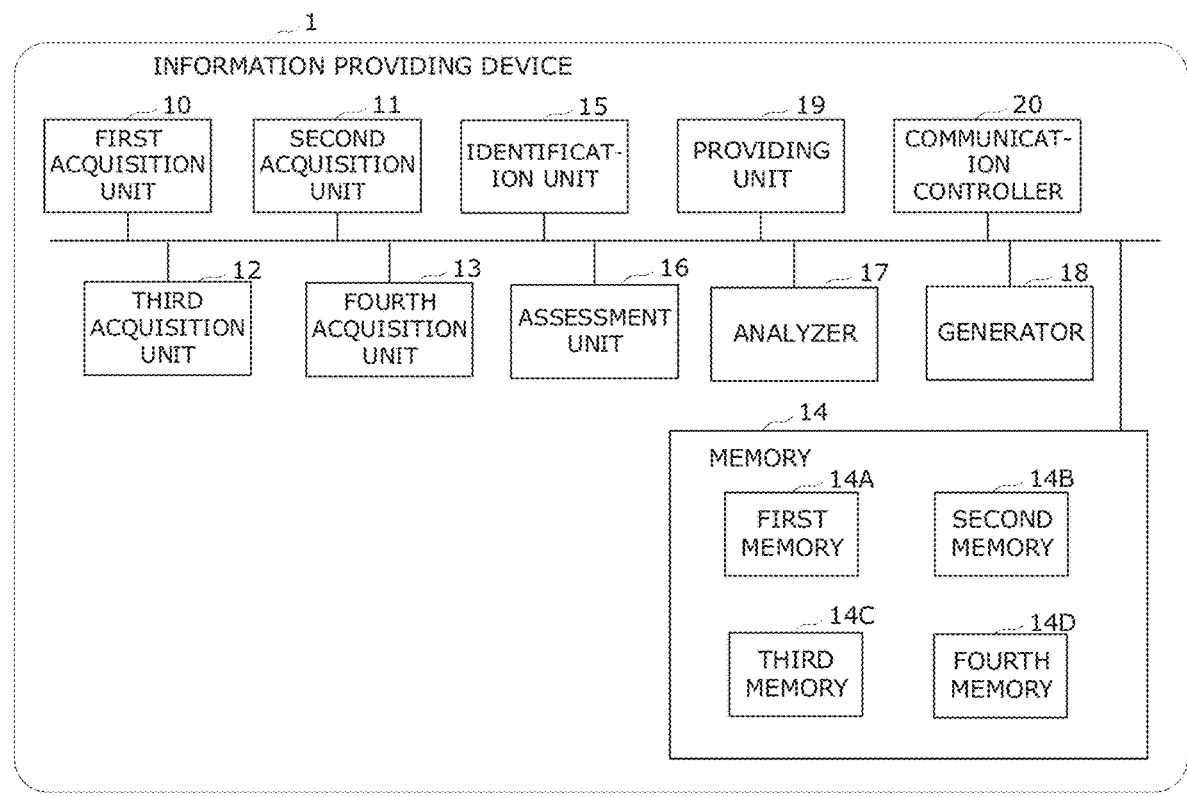
FIG. 1 is a block diagram showing a configuration of an information providing system according to an embodiment of the present disclosure.
Figure 1:
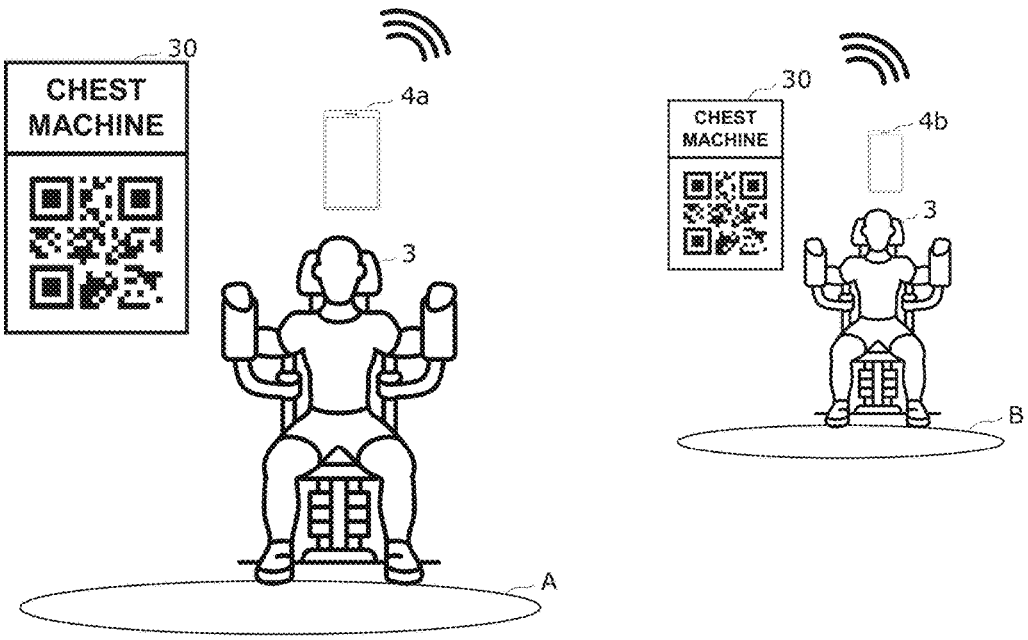

As illustrated in FIG. 1, for example, the information providing system includes an information providing device 1 and terminal devices 4a and 4b that are carried around by users, and the information providing device 1 and the terminal devices 4a and 4b are connected via a network such as a WAN (Wide Area Network), a LAN (Local Area Network), or the Internet.

In the present embodiment, a first user is working out with a fitness device 3 at a gym A. On the other hand, a second user is working out with the fitness device 3 at another gym B. The first user carries the terminal device 4a (the first terminal device) and the second user carries the terminal device 4b (the second terminal device). Note that there may be multiple second users.

As the terminal devices 4a and 4b, examples include mobile devices that can be carried around by the users such as smartphones, feature phones, PDAs, tablet computers, or smart glasses. The terminal device 4a and the terminal device 4b are connected to each other via a network such as the Internet, mobile data communication, or Wi-Fi (registered trademark) or via a near field communication network such as Bluetooth (registered trademark). Hereinafter, the terminal devices 4a and 4b may be collectively referred to as the terminal device 4.

The first user and the second user have user accounts on a dedicated online platform, such as an SNS or a web service related to working out, which were set up in advance for the information providing system according to the present embodiment, or they may use user accounts of an existing online platform. For example, the online platform includes common channels such as chat rooms and communities, organized by types of workouts, fitness goals, and the like. These channels are provided to the users as spaces for communication and information sharing related to common workouts.

In the present embodiment, information relating to the second user is provided to the first user who has a user account of a common online platform, as a recommendation or matching information. This allows the first user and the second user to connect on the online platform, forming a community and enabling communication between them. Additionally, the first user and the second user can establish a followed/follower relationship or a friend relationship on the predetermined online platform.

For example, establishing connection between the first user and the second user allows the first user to access a channel related to a common workout that the second user is already participating in. Additionally, the first user and the second user can share workout-related information using a messaging function or a chat function within the same channel. The first user and the second user can also post and share content such as text, photographs, or videos related to the workout in the same channel. By establishing a followed/follower relationship or friend relationship, the first user and the second user who are connected to each other can engage in more personalized communication such as receiving posts and updates on workout from a followed user as a feed or privately sending direct messages.

Other users to be described later, also work out at the gym using the fitness device 3 either simultaneously with or at a different time from the first user as these users carry the terminal device 4 while working out. In addition, like the first user and second user, these other users also have user accounts on the predetermined online platform.

[Configuration of Fitness Device]

The fitness device 3 is a device installed in a fitness facility such as a sports gym, a rehabilitation facility, or the like and examples thereof include wide varieties of workout machines such as walking machines/treadmills, fitness bikes, steppers, an abdominal machines, and chest press machines, instruments such as dumbbells and balance balls, and rehabilitation devices such as walkers.

A two-dimensional code 30, encoding information such as the type of fitness device 3, is attached to the fitness device 3. Instead of placing the two-dimensional code 30 on the fitness device 3, it could also be provided at the entrances of gyms A and B, where the fitness device 3 is located, or in each room within the gyms. The two-dimensional code 30 attached to the fitness device 3 is read by the users carrying the terminal devices 4a and 4b upon using the fitness device 3. Note that information indicating a type of exercise performed using the fitness device 3 may be embedded in the two-dimensional code 30.

[Functional Blocks of Information Providing Device]

As shown in FIG. 1, the information providing device 1 includes a first acquisition unit 10, a second acquisition unit 11, a third acquisition unit 12, a fourth acquisition unit 13, a memory 14, an identification unit 15, an assessment unit 16, an analyzer 17, a generator 18, a providing unit 19, and a communication controller 20.

The first acquisition unit 10 acquires information (first information) relating to an exercise (first exercise) to be performed by the first user. Specifically, the first acquisition unit 10 acquires information such as a type of the fitness device 3 to be used by the first user via the network from the terminal device 4a carried by the first user. In the present embodiment, the type of the fitness device 3 obtained by decoding a still image of the two-dimensional code 30 captured by a camera 410 of the terminal device 4a, is acquired by the first acquisition unit 10. In the present embodiment, the type of the exercise to be performed by a user is identified by identifying the type of the fitness device 3.

Further, the first acquisition unit 10 acquires time point information (first time point information) indicating the time point at which the first user is to engage in the exercise. The time point at which the exercise is performed includes both the start time of using the fitness device 3 and the end time of using the fitness device 3. For example, the first acquisition unit 10 can acquire the capture time of the two-dimensional code 30 as recorded by the camera 410 of the terminal device 4a, as the start time of the exercise. In addition, the first acquisition unit 10 can acquire the capture time of the two-dimensional code 30 recorded by the camera 410 at the start of using another fitness device 3 by the first user, as the end time of the exercise with the previous fitness device 3.

The information and the time point information relating to the exercise of the first user acquired by the first acquisition unit 10 are stored in a first memory 14A (to be described later) in association with a user ID of the first user. Note that the first acquisition unit 10 can also acquire information relating to exercises to be performed by the other users, including the second user, and time point information of their exercises.

The second acquisition unit 11 acquires information relating to the second user among the other users who engages in an exercise (second exercise) assessed by the assessment unit 16 (to be described later) as having a correlation of a certain level or higher with the information relating to the exercise to be performed by the first user. The second acquisition unit 11 can acquire information relating to the second user stored in advance in the first memory 14A to be described later. Alternatively, the second acquisition unit 11 can acquire information relating to the second user which is publicly available on the Internet via the network.

The third acquisition unit 12 acquires information (first objective information) relating to an objective of the first user of engaging in the exercise, as acquired by the first acquisition unit 10. The third acquisition unit 12 can acquire, via the network, information relating to an objective of engaging in the exercise set by the first user via an input operation or the like on the terminal device 4a. The information relating to the objective of engaging in the exercise can include, in addition to the objective of the exercise with the specific fitness device 3 acquired by the first acquisition unit 10, an objective that the first user aims to achieve through future scheduled exercises, and various exercises performed in the past. For example, the first user may have objectives such as increasing muscle strength, improving endurance, dieting, overcoming a lack of exercise, or the like by working out with the fitness device 3 and engaging in various exercises. Types of objectives or the number of objectives for engaging in exercises can be optionally set in the system.

In addition, the third acquisition unit 12 can acquire information relating to an objective for engaging in exercise for the respective other users including the second user. The objective information acquired by the third acquisition unit 12 is stored in a second memory 14B, to be described later, in association with a user ID.

The fourth acquisition unit 13 acquires information (first physical information) relating to the body of the first user. The fourth acquisition unit 13 can acquire height, weight, age, sex, and information related to lifestyle habits of the first user that are set by the first user via the terminal device 4a and information such as muscle mass and body-fat percentage measured by an external body composition analyzer as the information relating to the body of the first user.

In addition, the fourth acquisition unit 13 can acquire information relating to the bodies of other users including the second user via the network. The physical information acquired by the fourth acquisition unit 13 is stored in a third memory 14C to be described later.

The memory 14 includes the first memory 14A, the second memory 14B, the third memory 14C, and a fourth memory 14D. The first memory 14A stores information relating to exercise to be performed by the first user and by other users including the second user. In addition, the first memory 14A stores time points at which the first user and each of the other users engage in exercises. In other words, the first memory 14A stores a history of exercise performed by each user.

The second memory 14B stores information relating to objectives for exercise of the first user and other users, including the second user. The third memory 14C stores information relating to bodies of the first user and other users, including the second user. The fourth memory 14D stores information that will associate the first user and the second user with each other when the communication controller 20 (to be described later) establishes a connection between a user account of the first user and a user account of the second user on the predetermined online platform.

The identification unit 15 identifies facilities at which the first user and the other users each engage in exercise based on the information relating to the exercise to be performed by the first user and the information relating to the exercises to be performed by the other users. Specifically, the identification unit 15 can identify a facility where each user is currently or was engaging in exercise, based on location information from the GPS of the user's terminal device 4 or the two-dimensional code 30 attached to the fitness device 3. In this case, the two-dimensional code 30 consists of codes uniquely generated for fitness devices 3 installed in all facilities are used. Alternatively, a configuration may involve issuing the user a user account with the information of a facility in advance, which they use to log in when accessing the facility. In this case, the identification unit 15 can identify the facility based on this information.

The assessment unit 16 assesses a degree of correlation between the information relating to the exercise to be performed by the first user and information, stored in the first memory 14A, relating to exercise performed by other users who are different from the first user. The assessment unit 16 can assess the degree of correlation by a correlation coefficient, a scatter diagram, a regression analysis, or the like.

For example, let us assume that the first user is performing the chest press using the fitness device 3. While, those other users are performing various workouts using the fitness device 3 of a same type or different types such as chest press machines or treadmills. The assessment unit 16 assesses that when a type of workout, which is a type of exercise, is the same, the correlation is considered to be equal to or above a certain threshold. A correlation equal to or higher than a certain level is assessed when the type of workout is either similar or the same. For example, given that a treadmill and an air bike are both machines for aerobic exercises, the assessment unit 16 can make an assessment for these as having the correlation of equal to or higher than a certain level.

In addition, when assessing a degree of correlation between the information relating to the exercise to be performed by the first user and information relating to the exercise performed by other users, the assessment unit 16 can make an assessment in consideration of the objective (first objective information) of the first user for engaging in the exercise and the objectives of the other users for engaging in the exercises, which are acquired by the third acquisition unit 12 and stored in the second memory 14B.

For example, the first user runs on the treadmill with the objective of dieting. The second user, on the other hand, works out on the air bike with the objective of dieting. Another user works out on the air bike with the objective of increasing muscle strength. In this case, it is assessed that the correlation of the exercise performed by the second user, who shares the same objective as the first user, is higher than that of the other user's.

In addition, when assessing the degree of correlation, the assessment unit 16 can further take into consideration time point information (first time point information) indicating the time point at which the first user is to engage in the first exercise acquired by the first acquisition unit 10 and time point information regarding the time point at which each of the other users engage in the exercise stored in the first memory 14A. For example, even when other users perform the same type of exercise as the first user, a user who exercises at a date and time closer to when the first user exercised is assessed to have a higher correlation. Even if the same type of exercise is performed, a significant temporal difference can result in the exercise being assessed as having a lower correlation and potentially being excluded.

Furthermore, when assessing a degree of correlation, the assessment unit 16 can further take into consideration information (first physical information) relating to the body of the first user and information relating to the bodies of the other users stored in the third memory 14C. For example, the degree of correlation can be assessed by grouping other users whose height, weight, age, sex and muscle mass, body-fat percentage, or the like measured by an external body composition analyzer are similar to those of the first user.

The analyzer 17 analyzes a history of exercise to be performed by the second user stored in the first memory 14A in order to make a relative assessment of exercise to be performed by the first user. The first memory 14A stores a history of exercise performed by each user. A history of exercise includes information on a type of exercise recorded each time the user exercises, and includes information on a start time and end time of the exercise. For example, with respect to the first user and the second user who engage in the same type of workout, the analyzer 17 can analyze a present state of workout of the first user by comparing an average workout time of the second user with a workout time of the first user.

In addition, the analyzer 17 can analyze a workout trend of the second user based on a workout history of the second user, and predict future workout details or a future workout state of the first user. For example, consider a case where the second user used the bench press with 20 kg initial weight and was able to lift 50 kg weight after six months. Based on the second user's workout progress trend over time, it is capable to predict the bench press weight for the first user six months after they start bench-pressing.

Furthermore, the analyzer 17 can analyze a history of the exercise performed by other users to make a relative assessment of the first exercise to be performed by the first user for each of the facilities identified by the identification unit 15 where the first user and the other users each engage in exercise. For example, based on the workout history of all users who regularly use the gym A where the first user works out, trends in the type of workout the first user is engaged compared to the most common type of workout performed by users at the gym A can be analyzed.

For example, suppose that the first user's objective is to overcome a lack of exercise, and in the tally of exercise objectives for all users at the gym A, 60% of all users have the objective of overcoming a lack of exercise. Analyzing the overall exercise trends at the gym A can provide objective insights into the first user's exercise trends relative to other users who use the gym A or users within specific attributes.

The generator 18 generates an exercise menu to be recommended to the first user in order for the first user to achieve the objective of engaging in the first exercise based on the exercise performed by the second user. Specifically, the generator 18 generates the exercise menu to be recommended to the first user based on a history of the second user's exercise stored in the first memory 14A, the exercise objectives for each user stored in the second memory 14B, and the information regarding the second user's body stored in the third memory 14C.

For example, if the exercise history and the physical information of the second user indicate that the second user is already achieving better results of the workout ahead of other users, recommended menu similar to that of the second user's workout details can be generated based on the type, frequency, timing, or the like of the second user's workouts. For example, the exercise menu can suggest a specific exercise routine such as starting with chest press at 20 kg twice a week for the first month, and then increasing to 25 kg twice a week for the second month.

The providing unit 19 provides information relating to the second user acquired by the second acquisition unit 11 as assistance information to assist the first user engaging in exercise, in a form understandable to the first user. Specifically, the providing unit 19 can provide the first user's terminal device 4a with assistance information including sounds, images, videos, text, or combination thereof. Alternatively, the providing unit 19 can display the assistance information on a screen on a tablet terminal, a dietary supplement server, or the like installed in the gym A where the first user is using.

In addition, for example, the providing unit 19 can cause a display device 407 of the terminal device 4a to display information on the second user, a type of workout performed by the second user, and the like as the assistance information. More specifically, the providing unit 19 can recommend the second user to the first user on the predetermined online platform. Furthermore, the providing unit 19 can present a channel focused on a specific workout performed by both the first user and the second user to the first user as a candidate channel.

In addition, the providing unit 19 can provide, as assistance information, the exercise menu generated by the generator 18 to recommend to the first user. In addition, the providing unit 19 can provide the result of the analysis by the analyzer 17 as the assistance information. Furthermore, the providing unit 19 can provide, as the assistance information, the time point at which each of the first user and the second user had engaged in exercise stored in the first memory 14A. Furthermore, the providing unit 19 can provide, as the assistance information, information relating to the objective of engaging in exercise stored in the second memory 14B, and information relating to the body stored in the third memory 14C.

The communication controller 20 establishes communication between the terminal device 4a associated with the first user and the terminal device 4b associated with the second user based on information relating to the second user acquired by the second acquisition unit 11. In addition, the communication controller 20 establishes a connection between the first user's user account and the second user's user account on the predetermined online platform, and stores the first user and the second user in association with each other in the fourth memory 14D. In the fourth memory 14D, information related to a channel on an online platform that both the first user and second user commonly participate in may be further associated to indicate the relationship between the users.

Once the connection between the user account of the first user and the user account of the second user is established by the communication controller 20, a community of users, including both the first user and second user, is formed, and information about common workouts can then be shared through messages or chat. For example, the first user and the second user can share workout-related information using a chat function in a channel tailored to a shared workout, common goal, or the like.

In addition, when the first user sends a follow request or a friend request to the second user on the predetermined online platform and the second user accepts the request, the communication controller 20 can establish a followed/follower relationship or a friend relationship between the users. The communication controller 20 further stores information indicating the followed/follower relationship or the friend relationship between the first user and the second user in the fourth memory 14D.

[Hardware Configuration of Information Providing Device]

Next, an example of a hardware configuration that realizes the information providing device 1 including the functions described above will be described with reference to FIG. 2.

Figure 2:
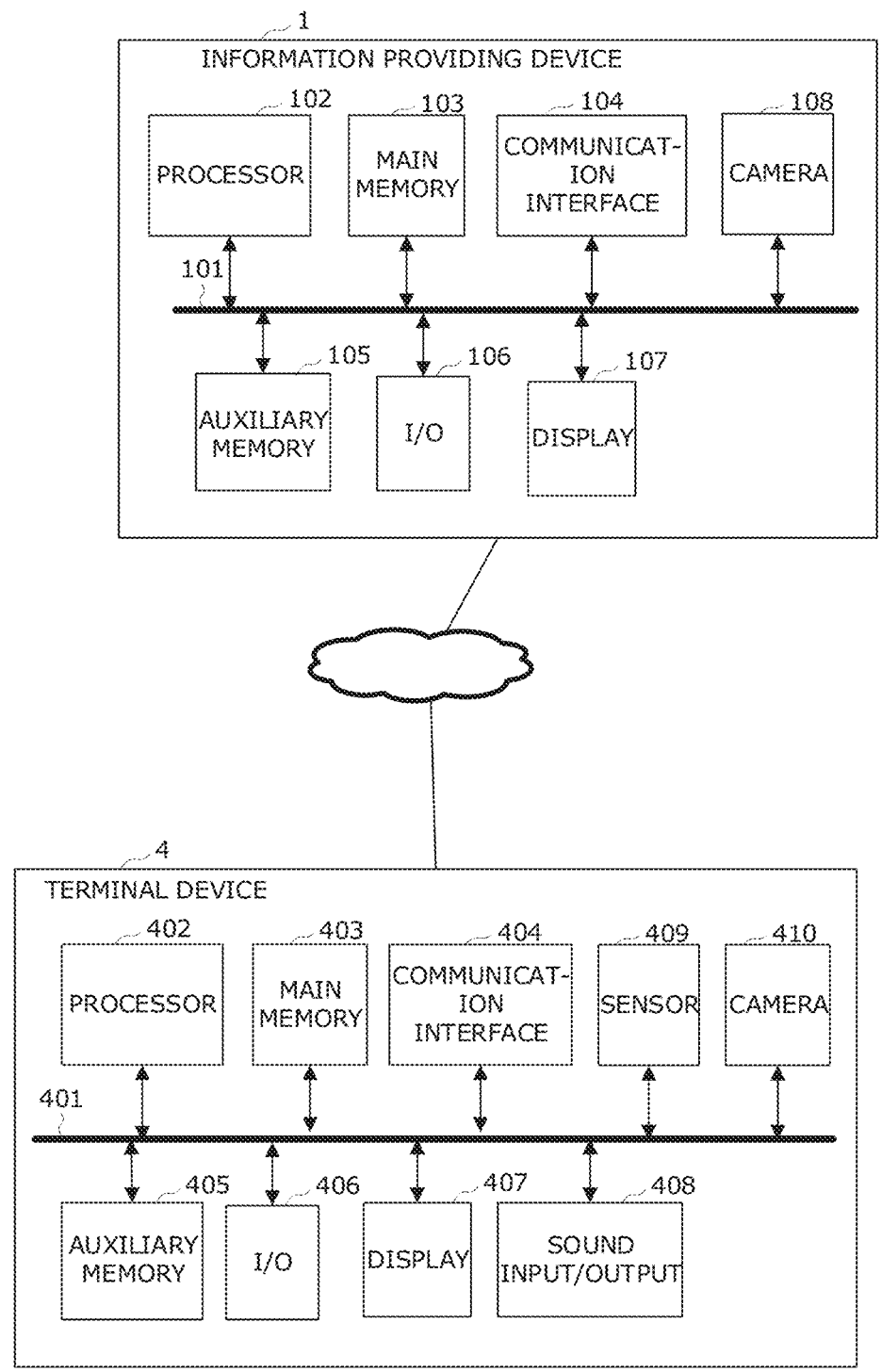
FIG. 2 is a block diagram showing a hardware configuration of the information providing system according to the present embodiment.

As shown in FIG. 2, for example, the information providing device 1 can be realized by a computer including a processor 102, a main storage 103, a communication interface 104, an auxiliary storage 105, and an input/output (I/O) 106 which are connected via a bus 101 and by a program for controlling these hardware resources.

The main storage 103 stores, in advance, a program used by the processor 102 for performing various control and computations. The processor 102 and the main storage 103 realize the respective functions of the information providing device 1 including the identification unit 15, the assessment unit 16, the analyzer 17, the generator 18, and the providing unit 19 shown in FIG. 1.

The communication interface 104 is an interface circuit for providing a network connection between the information providing device 1 and various external electronic equipment.

The auxiliary storage 105 includes a readable and writable storage medium and a driver for reading and writing various kinds of information such as programs and data with respect to the storage medium. In the auxiliary storage 105, a hard disk or a semiconductor memory such as a flash memory can be used as the storage medium.

The auxiliary storage 105 includes a program storage area for storing an information providing program to be executed by the information providing device 1. The storage 14 described with reference to FIG. 1 is realized by the auxiliary storage 105. Furthermore, for example, the auxiliary storage 105 may include a backup area or the like to back up the data and the programs described above.

The I/O 106 is an input/output that inputs signals from external devices and outputs signal to external devices.

A display 107 is realized by a liquid crystal display or the like.

A camera 108 can convert optical signals into image signals and generate moving images or still images.

[Hardware Configuration of Terminal Device]

Next, an example of a hardware configuration that realizes the terminal device 4 including the functions described above will be described with reference to FIG. 2.

As shown in FIG. 2, for example, the terminal device 4 can be realized by a computer including a processor 402, a main storage 403, a communication interface 404, an auxiliary storage 405, and an I/O 406 which are connected via a bus 401 and by a program for controlling these hardware resources in a similar manner to the information providing device 1.

A display 407 is realized by a liquid crystal display or the like and displays assistance information provided by the providing unit 19 of the information providing device 1.

A sound input/output 408 includes a microphone and a speaker. The sound input/output 408 converts an electric signal indicating assistance information into sound that are physical vibrations and outputs the sound. In addition, the sound input/output 408 picks up a voice of the user, converts the voice into an electric signal, and outputs the electric signals.

A sensor 409 includes an acceleration sensor, a vibration sensor, a gyroscope sensor, a geomagnetic sensor, a proximity sensor, an illuminance sensor, a pressure sensor, a GPS, a thermometer, and a hygrometer. In addition, the sensor 409 can be provided externally to the terminal device 4, and configured as a biological sensor such as an ECG sensor or a myoelectric sensor that measures biological information of the user.

A camera 410 can convert optical signals into image signals and generate moving images or still images. The camera 410 captures a still image of a two-dimensional code 30 attached to the fitness device 3, performs decoding of the captured two-dimensional code 30 with the processor 402, and detects information such as a type of the fitness device 3.

[Configuration of Storage]

Next, examples of table structures that constitute the storage 14 described with reference to FIG. 1 will be described with FIGS. 3 to 9.

FIG. 3 shows a user information table 500 in which an identifier of a user and a membership identifier of the user at a fitness facility such as a sports gym are associated with a user ID. Basic information about the user is initially registered in the user information table 500 upon user subscription to the information providing service according to the present embodiment. As mentioned earlier, the users in the present embodiment respectively have memberships at multiple gyms, each operated by different organizations.

FIG. 4 shows a facility table 510 in which a facility ID of each gym, a name of the gym, and information relating to the facility such as the address of the gym are associated with each other.

FIG. 5 shows a fitness device table 520 in which an identifier for each of the fitness devices 3 installed in a plurality of gyms, a facility ID of the gym in which the fitness device 3 is installed, a type of exercise that is performed by the fitness device 3, and an identification code are associated with each other. For example, each of the fitness devices 3 installed in a plurality of gyms can be uniquely identified. Thus, the gym where the fitness device 3 is installed is uniquely identified. Note that data stored in the fitness device table 520 corresponds to the information embedded in the two-dimensional code 30 attached to the fitness device 3 described above.

FIG. 6 shows an exercise information table 540 in which a fitness device ID, a facility ID, an exercise, an identification code, and time points of start and end of the exercise are associated with each user ID. The exercise information table 540 constitutes the first memory 14A described with reference to FIG. 1.

FIG. 7 shows an objective information table 550 in which information relating to an objective for engaging in exercise is associated with each user ID. The objective information table 550 constitutes the second memory 14B described with reference to FIG. 1.

FIG. 8 shows a physical information table 560 in which height, weight, sex, body-fat percentage, muscle mass, age, and the amount of change in body-fat percentage are associated with each user ID as information relating to the body. The physical information table 560 constitutes the third memory 14C described with reference to FIG. 1. The amount of change in body-fat percentage, for example, is the difference between the body-fat percentage at a predetermined past time point, such as the time of membership registration for the information providing service in the present embodiment, and the present body-fat percentage.

FIG. 9 shows a relationship table 570 that stores user IDs of users whose user accounts on the online platform have been linked and connected due to the assistance information provided by the providing unit 19 and communication established by the communication controller 20, as described with reference to FIG. 1. For example, a relationship ID can include information about a channel that users with mutually-connected user accounts are expected to participate in. Note that the relationship table 570 may be configured to further associate users who have a followed/follower relationship or a friend relationship on the online platform. The relationship table 570 constitutes the fourth memory 14D described with reference to FIG. 1.

[Operation Sequence of Information Providing System]

Next, an operation sequence of the information providing system configured as described above will be described with reference to FIG. 10.

First, an application starts up on the terminal device 4a carried by the first user (Step S201). Next, login processing and authentication of the first user are carried out between the terminal device 4a and the information providing device 1 (Step S202, Step S101). In Step S101, the information providing device 1 authenticates the first user by referring to the user information table 500. For example, the login processing can be performed by using the camera 108 of the information providing device 1, which is installed at an entrance of the gym used by the first user. The camera 108 reads a two-dimensional code displayed on a display screen of the terminal device 4a, that contains unique information for the first user.

Alternatively, various login processing methods can be used, including wireless authentication via Bluetooth Low Energy (BLE: a registered trademark) and authentication involving display of a one-time passcode on either the display screen of the display device 107 of the information providing device 1 installed in the gym or the display screen of the terminal device 4a, and then inputting the one-time passcode to the other device. The user login in Step S202 is login processing to a service provided by the information providing system.

Next, the terminal device 4a receives an input operation of information relating to the first user's objective of engaging in exercise and sets the objective (Step S203). The information relating to the first user's objective of engaging in exercise is transmitted to the information providing device 1 via the network from the communication interface 404 of the terminal device 4a. The first acquisition unit 10 of the information providing device 1 acquires the information relating to the first user's objective of engaging in exercise (Step S102). The information relating to the first user's objective of engaging in exercise acquired by the first acquisition unit 10 is stored in the second memory 14B (objective information table 550).

Next, the terminal device 4a transmits physical information measured by the sensor 409 or an input of the first user's physical information received by the I/O 406 to the information providing device 1, from the communication interface 404 via the network (Step S204). The third acquisition unit 12 of the information providing device 1 acquires the first user's physical information and stores the physical information in the third memory 14C (physical information table 560) (Step S103).

Next, the first user starts working out using the fitness device 3 at the gym A. At this time, the two-dimensional code 30 provided on the fitness device 3 is read using the camera 410 of the terminal device 4a (Step S205: YES). Next, the first acquisition unit 10 of the information providing device 1 acquires information relating to exercise to be performed by the first user based on the information read in Step S205 (Step S104). Subsequently, the first memory 14A (exercise information table 540) stores the ID of the fitness device 3 and a start time.

Each time the first user switches the fitness device 3 and engages in different exercise, the terminal device 4a reads the two-dimensional code 30 of the fitness device 3 used by the first user and stores the read time in the first memory 14A (exercise information table 540) as an exercise start time or an exercise end time. For example, the time at which the two-dimensional code 30 on another fitness device 3 is read when the first user begins using that fitness device 3 can be used as the workout end time for the previous fitness device 3.

Next, the identification unit 15 of the information providing device 1 identifies a facility where the first user engages in exercise from the information relating to exercise acquired in Step S104 (Step S105). The identification unit 15 can identify the facility where the first user engages in exercise by referring to the first memory 14A (exercise information table 540). For example, the two-dimensional code 30 contains a unique code for each fitness device 3, allowing it to identify the gym where the corresponding fitness device 3 is installed.

Figure 10:
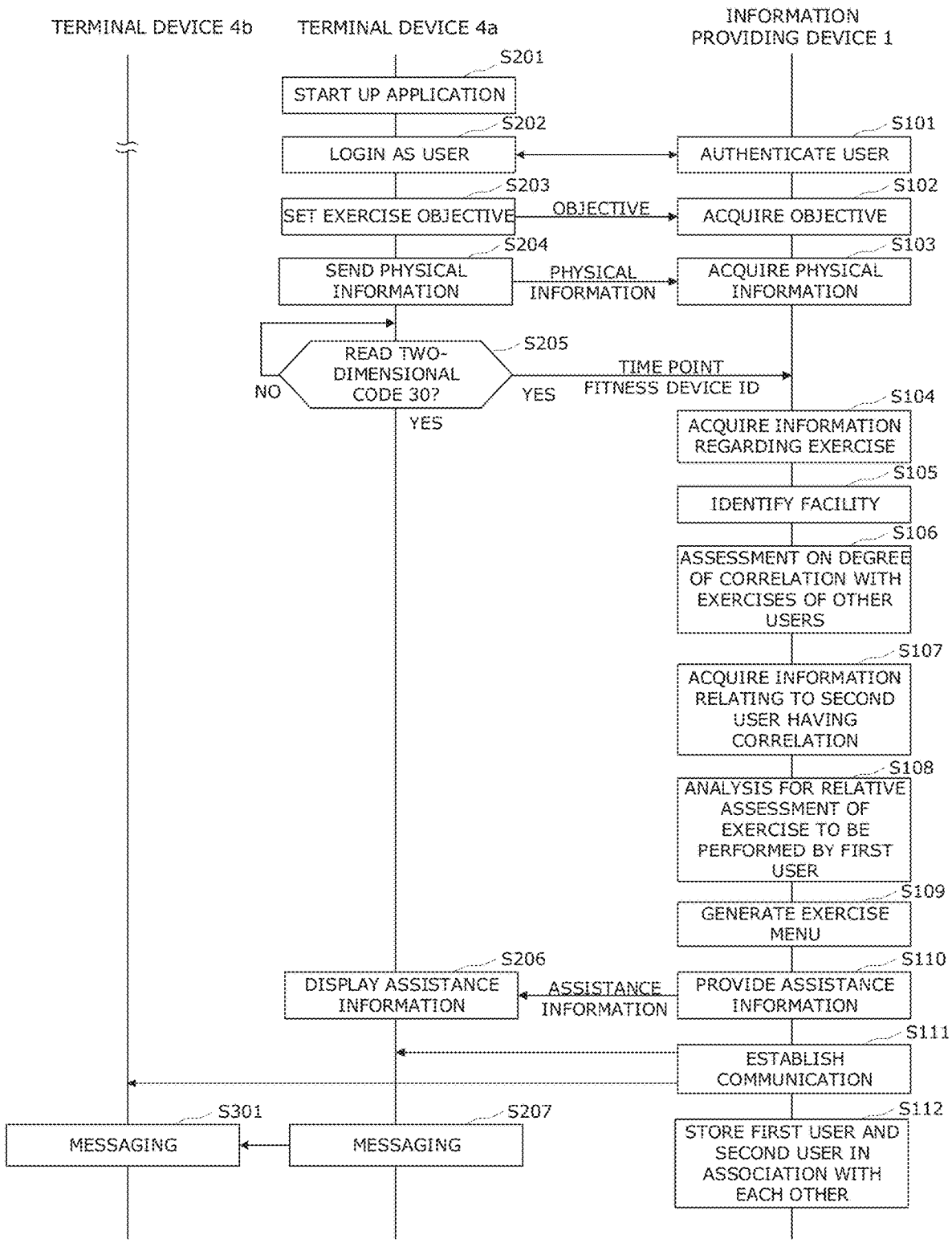
FIG. 10 is a sequence diagram for explaining operations of the information providing system according to the present embodiment.

Note that in FIG. 10, processes from Steps S201 to S205 involving terminal devices 4 of other users including the second user, and processes from Steps S101 to S104 involving the information providing device 1 have already been completed, and illustration of the processing has been omitted.

Next, the assessment unit 16 of the information providing device 1 assesses a degree of correlation between the information relating to the exercise of the first user and information relating to the exercises of the other users (Step S106). In Step S106, when assessing a correlation between the information relating to the exercise to be performed by the first user and information relating to the exercises to be performed by other users, the assessment unit 16 can make an assessment in consideration of the first user's objective of engaging in the exercise and the other users' objectives of engaging in the exercises, as acquired by the third acquisition unit 12 and stored in the second memory 14B (objective information table 550).

In addition, in step S106, the assessment unit 16 can further take into consideration time point information indicating the time point at which the first user is to engage in the exercise acquired by the first acquisition unit 10 in step S104 and time point information on the time point at which each of the other users is to engage in the exercise stored in advance in the first memory 14A (exercise information table 540).

Furthermore, when assessing the degree of correlation in step S106, the assessment unit 16 can further take into consideration information relating to the body of the first user acquired in step S103 and information relating to the body of the other users stored in advance in the third memory 14C.

Next, the second acquisition unit 11 of the information providing device 1 acquires information relating to the second user among the other users who engages in the exercise as assessed in Step S106 as having correlation of a certain level or higher with the information relating to the exercise to be performed by the first user (Step S107). In Step S107, the second acquisition unit 11 may acquire information relating to the second user that is publicly available on the Internet via the network.

Next, the analyzer 17 of the information providing device 1 analyzes the history of the exercise performed by the second user stored in the first memory 14A (exercise information table 540) in order to make a relative assessment of the exercise to be performed by the first user (Step S108). More specifically, the analyzer 17 can analyze the present workout state of the first user by comparing an average workout time of the second user with a workout time of the first user.

In addition, in Step S108, the analyzer 17 can analyze the workout trends of the second user based on the workout history of the second user and predict workout details or the future workout state of the first user.

Furthermore, in Step S108, the analyzer 17 can analyze the history of exercise performed by other users to make a relative assessment of the first exercise to be performed by the first user for each of the facilities, where the first user and the other users each engage in exercise, identified by the identification unit 15 in Step S105.

Next, the generator 18 of the information providing device 1 generates an exercise menu to be recommended to the first user based on the exercise performed by the second user (Step S109). Specifically, the generator 18 generates the exercise menu to be recommended to the first user based on the history of exercise of the second user stored in the first memory 14A (exercise information table 540), the second user's objective of exercise stored in the second memory 14B (objective information table 550), and the information on the second user's body stored in the third memory 14C (physical information table 560).

Next, the providing unit 19 of the information providing device 1 provides information relating to the second user acquired by the second acquisition unit 11 in Step S107 as assistance information to assist the first user engaging in exercise in a form easily understandable to the first user (Step S110).

The providing unit 19 causes, via the network, the display device 407 of the terminal device 4a to display information on the second user, the type of workout performed by the second user, and the like as the assistance information (Step S206). More specifically, the providing unit 19 can recommend the second user to the first user on the predetermined online platform. Furthermore, the providing unit 19 can present a channel focused on a specific workout performed by both the first user and second user as a candidate channel for the first user.

In addition, in Step S110, the providing unit 19 can provide, as the assistance information, the exercise menu generated by the generator 18 in Step S109 to recommend to the first user. In addition, in Step S110, the providing unit 19 can provide, as the assistance information, the result of the analysis by the analyzer 17 obtained in Step S108.

Furthermore, in Step S110, the providing unit 19 can provide, as the assistance information, the time point at which each of the first user and the second user engages in exercise stored in the first memory 14A (exercise information table 540). Furthermore, in Step S110, the providing unit 19 can provide, as the assistance information, the information relating to the objective of engaging in exercise stored in the second memory 14B (objective information table 550) and information relating to the body stored in the third memory 14C (physical information table 560).

Next, the communication controller 20 establishes communication between the terminal device 4a associated with the first user and the terminal device 4b associated with the second user based on the information relating to the second user acquired by the second acquisition unit 11 in Step S107 (step S111). In Step S111, the communication controller 20 establishes a connection between a user account of the first user and a user account of the second user on the predetermined online platform. In addition, the communication controller 20 stores the first user and the second user in association with each other in the fourth memory 14D (relationship table 570) (Step S112).

Subsequently, the first user and the second user of which user accounts have been connected, can share information about common exercises using the chat function or messaging function on their terminal devices 4a and 4b (Step S207, Step S301). In addition, in Step S207 and Step S301, by further establishing a followed/follower relationship or a friend relationship between the first user and the second user, the first user and the second user can exchange messages and share information individually via their terminal devices 4a and 4b.

Note that the order of the steps shown in FIG. 10 is for convenience of description and may be rearranged.

[Configuration of Display Screen]

Next, exemplary displays of the assistance information provided by the providing unit 19 of the information providing system described above will now be described with reference to FIGS. 11 to 14.

Figure 11:
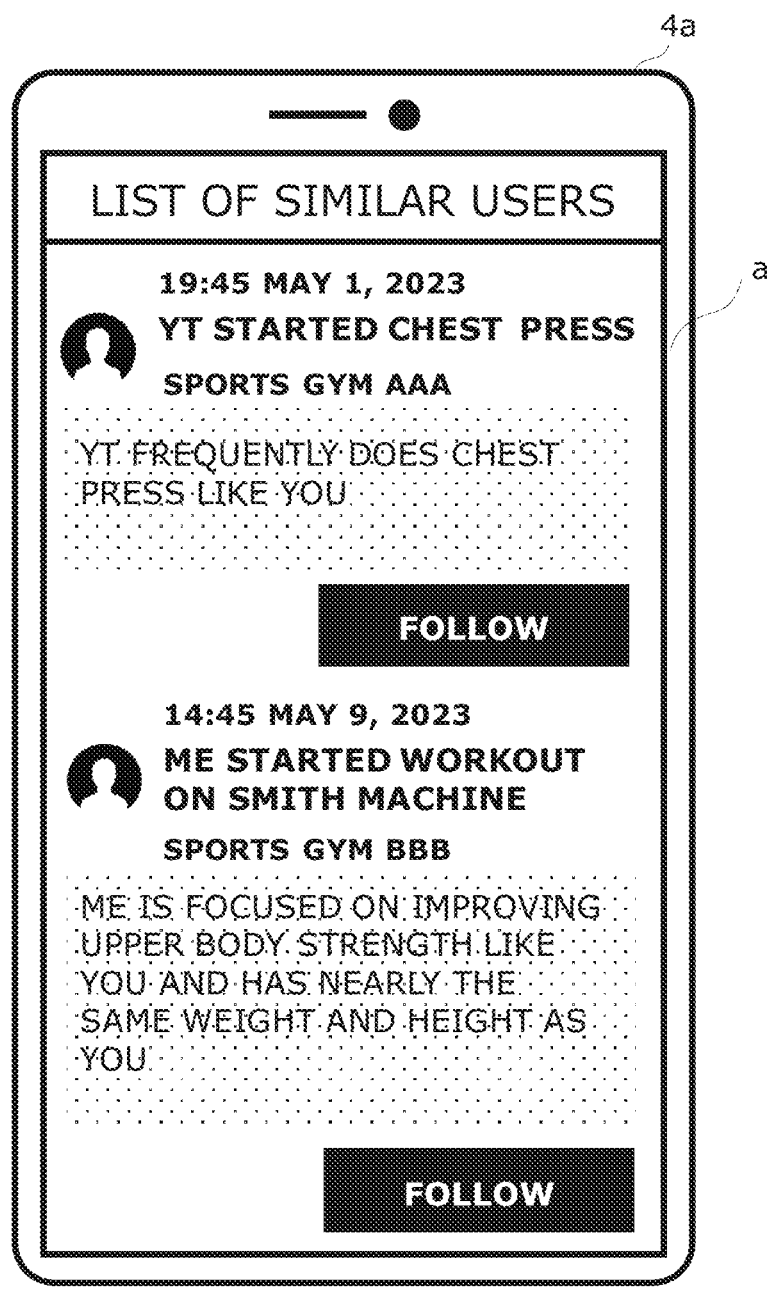
FIG. 11 is a diagram showing a display example of assistance information provided by the information providing system according to the present embodiment.

FIGS. 11 to 14 show examples of the assistance information displayed on the screen of the display device 407 of the terminal device 4a. FIG. 11 shows an example display of information relating to exercise to be performed by the second user considered to have a correlation with information relating to exercise to be performed by the first user. As a "list of similar users", the type of exercise, the start time point, the facility name, the physical information, and the objective of engaging in exercise of two second users "YT" and "ME" are displayed in an area "a" of the display screen on the first user's terminal device 4a.

Furthermore, a "follow" button is displayed in areas where each of the second users "YT" and "ME" are displayed and, by clicking the buttons, the first user can follow each of the second users. Note that a "send message" button can be provided instead of the "follow" button. Providing the "send message" button enables the first user and the second user to exchange messages and share information without having to establish a followed/follower relationship or a friend relationship.

In the area where information relating to the second user "YT" is displayed, the text that reads "YT frequently does chest press like you" is displayed. This text information represents assistance information based on the result of the analysis by the analyzer 17 on the exercise history of the second user "YT".

In the area where information relating to the other second user "ME" is displayed, the text that reads "ME is focused on improving upper body strength like you and has nearly the same weight and height as you" is displayed. This text information indicates assistance information based on information relating to the objective of engaging in exercise stored in the second memory 14B (objective information table 550) and physical information stored in the third memory 14C (physical information table 560).

Figure 12:
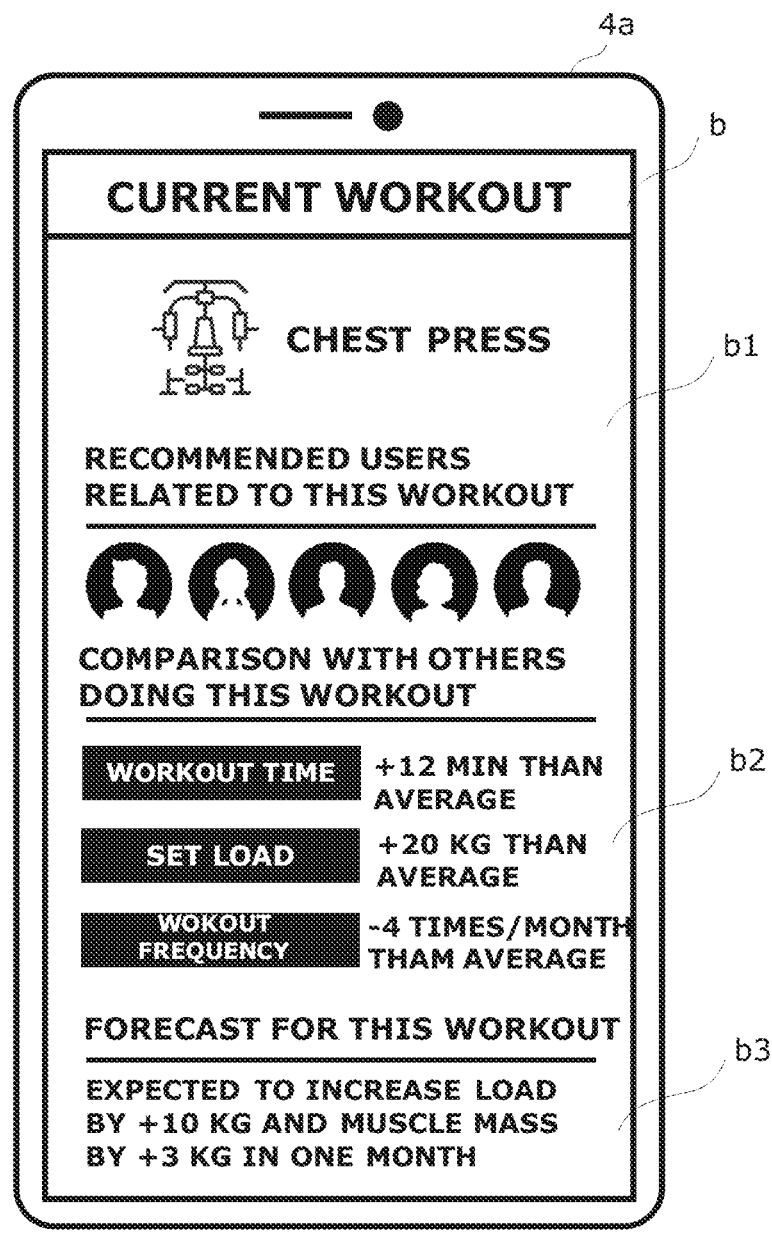
FIG. 12 is a diagram showing a display example of assistance information provided by the information providing system according to the present embodiment.

FIG. 12 is a diagram showing another example display of the assistance information. Text information reading "current workout" is displayed in the area "b" in FIG. 12. The area "b1" shows a type of exercise, "chest press" is currently performed by the first user, and shows profile images of users whose correlation is assessed to be equal to or higher than a certain level by the assessment unit 16, are displayed as the information relating to the second users.

In the area "b2", differences in the first user's "workout time", "set load", and "workout frequency" from the second user's "workout time", "set load", and "workout frequency" who are engaging in the same chest press exercise are separately displayed. These comparison values represent the result of analysis on the exercise history of the second users carried out by the analyzer 17. By comparing the exercise time, the set load, and the exercise frequency of the first user and the values of the second users having correlation with the first user, the assistance information that enables the first user to objectively comprehend their own exercise can be provided to the first user.

In the area "b3", text information reading "Expected to increase load by +10 kg and muscle mass by +3 kg in one month" is displayed indicating as "forecast for this workout". This assistance information indicates the analysis result by the analyzer 17 which predicts the first user's future trends of exercise by analyzing the second users' exercise history. For many users, workout time duration and intensity gradually increase as they continue working out at the gym. As described in the aforementioned example, a user who starts bench pressing with a 20 kg load may progress to 50 kg after six months. From this perspective, analyzing the future trend of a user's exercise performance can provide valuable assistance information. Understanding that consistent effort can lead to specific and tangible results may help maintain or even boost the first user's motivation to continue exercising.

In addition, beginner users who are just starting to train at the gym may want to know roughly how long it will take for them to reach a certain level of intensity or load. From this perspective, providing the first user with progress projections based on the training progress of other users can help encourage the first user to maintain their motivation for continued training.

Figure 13:
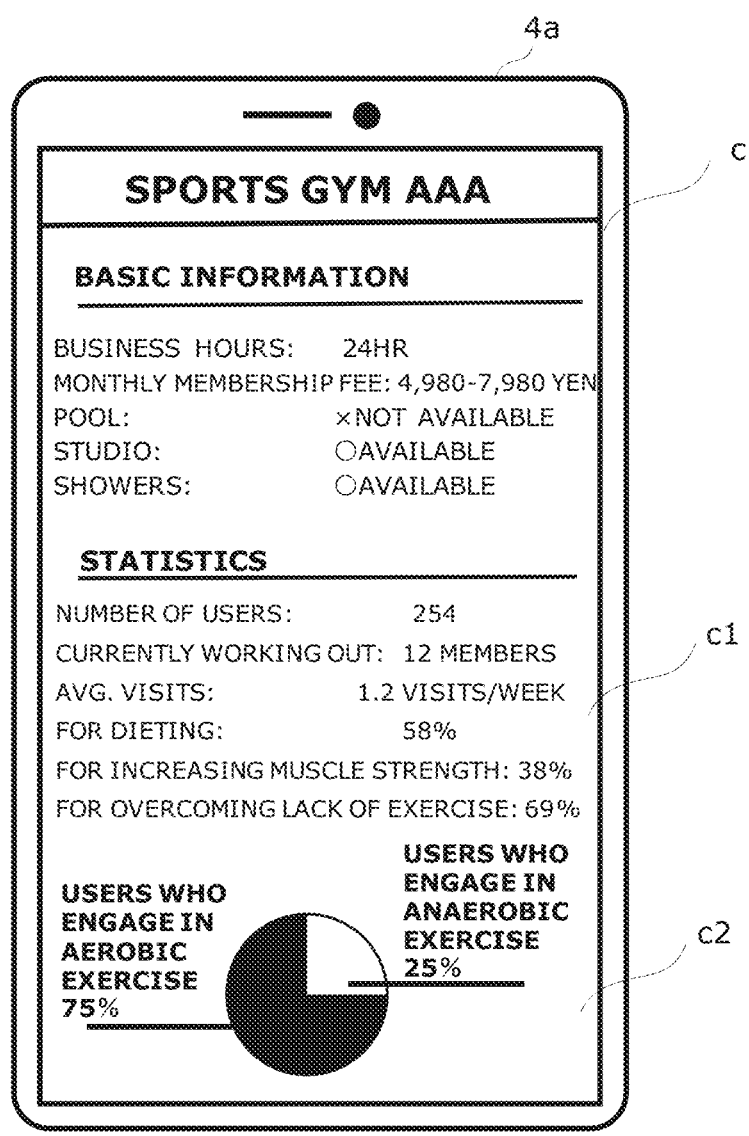
FIG. 13 is a diagram showing a display example of assistance information provided by the information providing system according to the present embodiment.

FIG. 13 is a diagram showing another example display of assistance information. A facility name "Sports Gym AAA" is displayed as text information in the area "c". Also, basic information of "Sports Gym AAA" is displayed in the area "c". Statistical information of users who use "Sports Gym AAA" is displayed in the area "c1". Specifically, "number of users" who use the gym, the number of users "currently working out", and "average visits" indicating an average number of weekly visits to "Sports Gym AAA" are displayed in the area "c1". Additionally, in the area "c1", proportions of users at the gym who have goals such as "for dieting", "for increasing muscle strength", and "for overcoming a lack of exercise" are displayed.

In the area "c2", the proportions of users at the "Sports Gym AAA" "who engage in aerobic exercises" and "who engage in anaerobic exercises" are displayed as a pie chart. The assistance information displayed in the area "c1" and the area "c2" is the result of the analysis of the users' exercise history, conducted by the analyzer 17 for each facility where the users engage in exercise, as identified by the identification unit 15. By providing the first user with the assistance information, which includes the aggregated exercise histories, user numbers, and workout trends of the entire gym, the first user's motivation to exercise can be enhanced.

Figure 14:
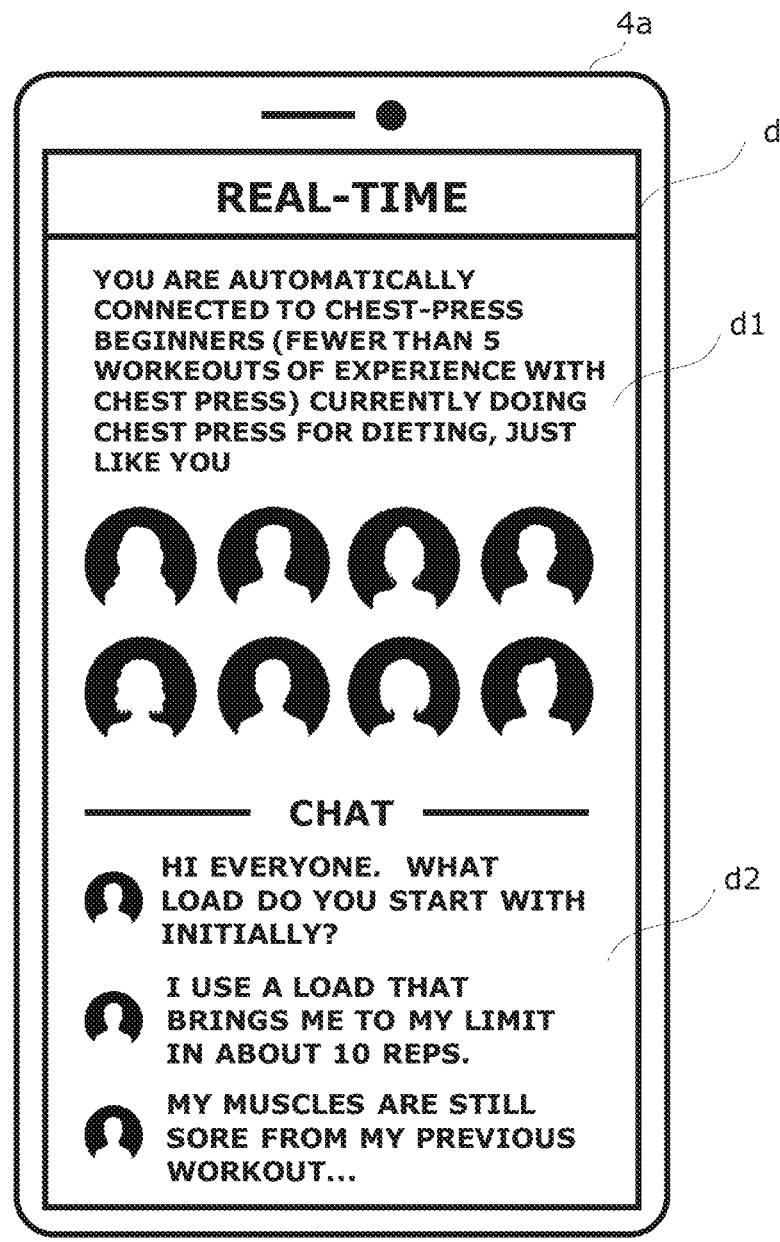
FIG. 14 is a diagram showing a display example of assistance information provided by the information providing system according to the present embodiment.

FIG. 14 is a diagram showing another example display of the assistance information. In the area "d", the profile images of the second users, who, like the first user, is performing the "chest press" in real-time for the purpose of "dieting" and are beginners with fewer than five chest press workout experience, are displayed. Additionally, in the area "d1", it is indicated that the first user is automatically connected to the second user. In other words, the area "d1" shows that the communication controller 20 has established communication between the first user's terminal device 4a and the second user's terminal device 4b based on the information relating to the second users, as acquired by the second acquisition unit 11. Further, more specifically, the area "d1" displays a status where, for example, the first user and the second users have entered a group that perform the same workout.

In the area "d2", the interaction between the first user and the second users as they chat in real-time about their workout while working out is displayed. As shown in the area "d2", the first user and the second users, who are performing the same workout for similar objectives, are automatically able to start a chat. In this way, the information providing system according to the present embodiment automatically establishes a connection for the first user between the first user and the second users who are performing the same workout for similar objectives, establishing an environment where they can exchange information about their workouts in real-time. Since the first user can work out alongside the second users, this leads to an increase in motivation for both the first and second users.

As described above, according to the information providing system of the present disclosure, the degree of correlation between the information relating to the first user's exercise and the information relating to the second user's exercises to be performed by other users is assessed. The information relating to the second user, among the other users, who engages in the exercise that has a correlation of a certain level or higher, is acquired and provided as the assistance information to the first user. This allows for more effective exercise assistance that enhances users' motivation for exercise.

In addition, according to the information providing system of the present embodiment, the communication controller 20 automatically establishes a connection between users in related exercises. As a result, users do not need to manually search for channels related to their exercises on online platforms. Since users are automatically directed to channels that match their specific exercise and objectives, users can more easily gather relevant information, which in turn helps boost their motivation to continue exercising.

In the described embodiment, the functional components of the information providing system are exemplified as being provided in the information providing device 1. However, the functional components of the information providing system can also be distributed across multiple servers on the network. Additionally, part of the functional components can be configured to be provided by the terminal device 4.

In the described embodiment, the first acquisition unit 10 was exemplified as acquiring information relating to the exercise to be performed by the first user. However, the first acquisition unit 10 may also obtain information relating to exercises that the first user is predicted to perform in the future. In this case, the first acquisition unit 10 can additionally acquire the future time when the first user is expected to perform the predicted exercise.

Specifically, the generator 18 can recommend an exercise menu for the first user, which the first acquisition unit 10 then obtains from the generator 18 as predicted future exercises. Additionally, the analyzer 17 can analyze trends in the timing when the first user is exercising to acquire information and timing about the first user's future exercises. Alternatively, the first user can input exercise information and scheduled time via an input operation on terminal device 4a for exercises planned in the future.

In the described embodiment, information relating to the exercise to be performed by the user is acquired by reading the two-dimensional code 30 on the fitness device 3. However, the method by which the first acquisition unit 10 acquires information relating to the exercise is not limited to reading the two-dimensional code 30.

For example, the first acquisition unit 10 can perform image recognition on images captured by a camera set up in a facility such as a sports gym where the fitness device 3 is installed. The camera can detect objects including the user and the fitness device 3, and thereby obtain information about the exercise. For instance, using deep learning techniques such as R-CNN, SSD, YOLO, or Fast R-CNN, the user and the fitness device 3 can be detected as objects, and information relating to the exercise can be acquired by inferring the class and location of the detected objects.

While there are described herein embodiments of an information providing system and an information providing method according to the present disclosure, the present disclosure is not limited to the described embodiments and various modifications that could be conceived by those skilled in the art may be made within the scope of the invention described in the claims.

REFERENCE SIGNS LIST

1 . . . information providing device, 3 . . . fitness device, 4, 4a, 4b . . . terminal device, 10 . . . first acquisition unit, 11 . . . second acquisition unit, 12 . . . third acquisition unit, 13 . . . fourth acquisition unit, 14 . . . memory, 15 . . . identification unit, 16 . . . assessment unit, 17 . . . analyzer, 18 . . . generator, 19 . . . providing unit, 20 . . . communication controller, 30 . . . two-dimensional code, 101, 401 . . . bus, 102, 402 . . . processor, 103, 403 . . . main storage, 104, 404 . . . communication interface, 105, 405 . . . auxiliary storage, 106, 406 . . . . I/O, 107, 407 display, 108, 410 . . . camera, 408 . . . sound input/output, 409 . . . sensor, A, B . . . gym.

What is claimed is:

1. A communication server, comprising:
   an electronic processor;
   a memory storing deep learning techniques, first information relating to exercises to be performed by other users, second information relating to objectives of the other users of engaging in the exercises, and a correlation model, the memory communicatively coupled to the electronic processor; and
   an interface;
   wherein the electronic processor is configured to:
      receive an electronic exercise information table from a first terminal device associated with a first user, the electronic exercise information table indicating a user identifier of the first user that is separate and distinct from the other users including a second user, a fitness device identifier, a facility identifier, a first exercise being performed by the first user, an exercise machine identifier, and a date and time that the first exercise is being performed,
      control, in response to receiving the electronic exercise information table, a camera to capture and transmit to the electronic processor, image data the camera being associated with the fitness device identifier and the facility identifier,
      process, using the deep learning techniques, the image data to acquire third information relating to the first exercise being performed by the first user;
      assess, in response to receiving the third information and using the correlation model, a degree of correlation between the first information and the third information;
      acquire, from one or more data sources including the memory or external data configured to store fourth information relating to the second user, the fourth information relating to the second user among the other users who engages in a second exercise assessed by the electronic processor as having a correlation of a certain level or higher with the third information; and
      control a communication controller to establish, via the interface, an electronic data communication session between the first terminal device and a second terminal device associated with the second user, based on identification information of the second user included in information relating to the second user acquired by the electronic processor,
   wherein the electronic data communication session allows for communication between the first user and the second user via the first terminal device and the second terminal device, respectively, and wherein the second terminal device and the second user are separate and distinct from the first terminal device and the first user, respectively.

2. The communication server according to claim 1, wherein the electronic processor is further configured to:
control the interface to output one or more electronic signals to control an electronic display or an electronic speaker of the first terminal device associated with the first user to output the fourth information and assistance information to assist the first user that engaged in the first exercise in the form of a sound, an image, a video, a text, or a combination thereof,
acquire, via the interface, first objective information relating to an objective of the first user that engaged in the first exercise, and
assess, using the correlation model, the degree of correlation between the first information and the third information in consideration of the first objective information and the second information.

3. The communication server according to claim 2, wherein the electronic processor is further configured to:
generate an exercise menu to be recommended to the first user in order for the first user to achieve the objective of engaging in the first exercise, based on the second exercise performed by the second user stored in the memory, wherein
the electronic processor is further configured to:
generate, as the exercise menu, workout details which include a type, a frequency, a timing, a load, or a combination thereof of the first exercise, the generation being based on automated processing of a history of the second exercise to be performed by the second user stored in the memory, the history of the second exercise including a type, a frequency, a timing, a load, or a combination thereof of the second user; and
reflect, in the workout details of the generated exercise menu, a pattern of the type, the frequency, the timing, the load, or the combination thereof identified from the history of the second exercise to be performed by the second user; and
the assistance information includes the generated exercise menu.

4. The communication server according to claim 2, wherein the electronic processor is further configured to:
analyze, using a relative assessment model stored in the memory executed by the electronic processor in order to make a relative assessment of the first exercise to be performed by the first user, a history of the second exercise to be performed by the second user stored in the memory, the history of the second exercise including at least a type, a frequency, a timing, a load, or a combination thereof of the second exercise performed by the second user, wherein
the electronic processor is further configured to:
compare a time during which the second user had engaged in the second exercise with a time during which the first user had engaged in the first exercise, to determine a present workout state of the first exercise performed by the first user; and
analyze a trend in a workout progress over time for the second exercise performed by the second user based on a time series of the load or the frequency in the history of the second exercise performed by the second user stored in the memory, and predict, based on the trend, at least one of workout details or a future workout state of the first exercise performed by the first user; and wherein the assistance information includes a result of the analysis by the electronic processor.

5. The communication server according to claim 4, wherein the electronic processor is further configured to:
identify facilities at which the first user and the other users each engage in exercises based on the first information and the third information, wherein
the electronic processor is further configured to:
analyze a history of exercises to be performed by the other users stored in the memory, and using the relative assessment model stored in the memory executed by the electronic processor in order to make a relative assessment of the first exercise to be performed by the first user for each of the facilities at which the first user and the other users each engage in exercises;
identify, using facility-related data stored in the memory, the facilities at which the first user and the other users each engage in exercises based on any of (i) location information of terminal devices respectively carried by the first user and the other users engaging in exercises included in the first information and the third information, (ii) information indicating unique codes generated for fitness devices respectively used by the first user and the other users engaging in exercises and are uniquely generated for fitness devices installed in all facilities, and (iii) login information of user accounts including the information on facilities given when the first user and the other users use the facilities at which the first user and the other users each engage in the exercises; and
analyze, by referencing a facility-level history of exercise stored in the memory, a trend of the first exercise being performed by the first user with respect to exercises performed by a larger number of users at the facilities from a history of exercises of all users who engage in the exercises at the facilities.

6. The communication server according to claim 1, wherein the memory is storing fifth information relating to bodies of the other users, and wherein the electronic processor is further configured to:
acquire, via the interface, and store in the memory, first physical information relating to a body of the first user, the first physical information being measured by at least one of sensors or input via the interface and transmitted to the electronic processor, wherein
the electronic processor is further configured to
assess, using the correlation model stored in the memory executed by the electronic processor, the degree of correlation between the first information and the third information in consideration of the first physical information and the fifth information.

7. The communication server according to claim 1, wherein the electronic data communication session enables an exchange of exercise-related information between the first terminal device and the second terminal device.

8. The communication server according to claim 7, wherein the electronic processor is further configured to:
control the communication controller to establish, vis a network, a connection between a user account of the first user and a user account of the second user on a predetermined online platform; and store, in the memory, an association between the first user and the second user based on the established electronic data communication session to facilitate a subsequent electronic communication of the exercise-related information through the predetermined online platform.

9. The communication server according to claim 1, wherein the electronic processor is further configured to:
acquire, via the interface, first time point information indicating a time point at which the first user is to engage in the first exercise, the time point information being determined based on an input received from the first terminal device associated with the first user, the input corresponding to a start of the first exercise,
wherein the memory is further configured to store time point information on a time point at which each of the other users is to engage in the exercises, and
wherein the electronic processor is further configured to:
assess, using the correlation model stored in the memory executed by the electronic processor, the degree of correlation between the first information and the third information in consideration of the first time point information and the time point information, stored in the memory, relating to a time point at which each of the other users is to engage in the exercise to determine a temporal proximity between the first exercise and the exercises.

10. The communication server according to claim 1, wherein the deep learning techniques include one or more selected from a group consisting of:
regions with convolutional neural networks (R-CNN), single shot multibox detector (SSD),
you only look once single-stage detector (YOLO), and
fast regions with convolutional neural networks (Fast R-CNN).

11. A communication method comprising:
receiving, with an electronic processor, an electronic exercise information table from a first terminal device associated with a first user, the electronic exercise information table indicating a user identifier of the first user that is separate and distinct from other users, a fitness device identifier, a facility identifier, a first exercise being performed by the first user, an exercise machine identifier, and a date and time that the first exercise is being performed;
in response to receiving the electronic exercise information table, controlling, with the electronic processor, a camera to capture and transmit an image data, the camera being associated with the fitness device identifier and the facility;
in response to receiving the image data, processing, with the electronic processor and deep learning techniques, the image data to acquire first information relating to the first exercise;
assessing, in response to receiving the first information and using a correlation model stored in a memory and executed by the electronic processor, a degree of correlation between the first information and second information, stored in the memory, relating to exercises to be performed by other users different from the first user;
acquiring, with the electronic processor from one or more data sources including the memory or an external data configured to store third information relating to a second user, the third information relating to the second user among the other users who engages in a second exercise assessed as having a correlation of a certain level or higher with the first information; and controlling, with the electronic processor, a communication controller to establish, via an interface, an electronic data communication session between the first terminal device and a second terminal device associated with the second user, based on identification information of the second user included in information relating to the second user acquired by the electronic processor,
wherein the electronic data communication session allows for communication between the first user and the second user via the first terminal device and the second terminal device, respectively, and
wherein the second terminal device and the second user are separate and distinct from the first terminal device and the first user, respectively.

12. The communication method according to claim 11, further comprising:
controlling, with the electronic processor, an interface to output one or more electronic signals to control an electronic display or an electronic speaker of a terminal device associated with the first user to output the third information and assistance information to assist the first user engaging in the first exercise in a form of a sound, an image, a video, a text, or a combination thereof;
acquiring, with the electronic processor via the interface, first objective information input via a user interface or previously stored in the memory, the first objective information relating to an objective of the first user of engaging in the first exercise; and
assessing, using the correlation model stored in the memory executed by the electronic processor, the degree of correlation between the first information and the second information in consideration of the first objective information and fourth information, stored in the memory, relating to objectives of the other users of engaging in the exercises.

13. The communication method according to claim 12, further comprising:
generating an exercise menu to be recommended to the first user in order for the first user to achieve the objective of engaging in the first exercise, based on the second exercise having been performed by the second user stored in the memory;
wherein generating the exercise menu to be recommended to the first user in order for the first user to achieve the objective of engaging in the first exercise further includes
generating as the exercise menu, workout details which include a type, a frequency, a timing, a load, or a combination thereof of the first exercise, the generation being based on automated processing of a history of the second exercise to be performed by the second user stored in the memory, the history of the second exercise including a type, a frequency, a timing, a load, or a combination thereof of the second user; and
reflecting, in the workout details of the generated exercise menu, a pattern of the type, the frequency, the timing, the load, or the combination thereof identified from the history of the second exercise to be performed by the second user, and
wherein the assistance information includes the generated exercise menu.

14. The communication method according to claim 12, further comprising:
analyzing, using a relative assessment model stored in the memory executed by the electronic processor in order to make a relative assessment of the first exercise to be performed by the first user, a history of the second exercise to be performed by the second user stored in the memory, the history of the second exercise including at least a type, a frequency, a timing, a load, or a combination thereof of the second exercise performed by the second user; and wherein analyzing the history of the second exercise to be performed by the second user stored in the memory further includes comparing a time during which the second user had engaged in the second exercise with a time during which the first user had engaged in the first exercise, to determine a present workout state of the first exercise performed by the first user is analyzed; and analyzing a trend of workout progress over time for the second exercise performed by the second user based on a time series of the load or the frequency in the history of the second exercise of the second user stored in the memory, and predicting, based on the trend, at least one of workout details or a future workout state of the first exercise performed by the first user, wherein the assistance information includes a result of the analysis obtained from analyzing the history of the second exercise to be performed by the second user stored in the memory.

15. The communication method according to claim 14, further comprising:

identifying facilities at which the first user and the other users each engage in exercises based on the first information and the second information, wherein analyzing the history of the second exercise to be performed by the second user stored in the memory further includes analyzing a history of exercises to be performed by the other users stored in the memory, and using the relative assessment model stored in the memory executed by the electronic processor in order to make a relative assessment of the first exercise to be performed by the first user for each of the facilities at which the first user and the other users each engage in exercises, wherein identifying the facilities at which the first user and the other users each engage in the exercises based on the first information and the second information further includes identifying, using facility-related data stored in the memory, the facilities at which the first user and the other users each engage in exercises are identified based on any of (i) location information of terminal devices respectively carried by the first user and the other users engaging in exercises included in the first information and the second information, (ii) unique code information indicating unique codes generated for fitness devices respectively used by the first user and the other users engaging in exercises and are uniquely generated for fitness devices installed in all facilities, and (iii) login information of user accounts including facility information on when the first user and the other users use the facilities at which the first user and the other users each engage in the exercises, and wherein analyzing the history of the second exercise to be performed by the second user stored in the memory further includes analyzing, by referencing a facility-level history of exercise stored in the memory, a trend of the first exercise being performed by the first user with respect to exercises performed by a larger number of users at the facilities is analyzed from a history of exercises of all users who engage in the exercises at the facilities.

16. The communication method according to claim 11, further comprising acquiring, via the interface, and store in the memory, first physical information relating to a body of the first user, the first physical information being measured by at least one of sensors or input via the interface and transmitted to the electronic processor, wherein assessing the degree of correlation between the first information and second information relating to the exercises to be performed by the other users different from the first user further includes assessing, using the correlation model stored in the memory executed by the electronic processor, the degree of correlation between the first information and the second information is assessed in consideration of the first physical information and fifth information relating to the bodies of the other users stored in the memory.

17. The communication method according to claim 11, wherein the electronic data communication session enables an exchange of exercise-related information between the first terminal device and the second terminal device.

18. The communication method according to claim 17, wherein controlling the communication controller to establish the electronic data communication session between the first terminal device associated with the first user and the second terminal device associated with the second user further includes controlling the communication controller to establish, via a network, a connection between a user account of the first user and a user account of the second user on a predetermined online platform, and storing, in the memory, an association between the first user and the second user based on the established electronic data communication session to facilitate a subsequent electronic communication of the exercise-related information through the predetermined online platform.

19. The communication method according to claim 11, wherein acquiring the first information relating to the first exercise to be performed by the first user by causing the camera to capture and transmit to the electronic processor the image data further includes acquiring, via the interface, first time point information indicating a time point at which the first user is to engage in the first exercise, the first time point information being determined based on an input received from the terminal device associated with the first user, the input corresponding to a start of the first exercise, the memory further storing time point information on a time point at which each of the other users is to engage in the exercises, and wherein assessing the degree of correlation between the first information and second information relating to the exercises to be performed by the other users different from the first user further includes assessing, using the correlation model stored in the memory executed by the electronic processor, the degree of correlation between the first information and the second information is assessed in consideration of the first time point information and the time point information, stored in the first memory, relating to a time point at which each of the other users is to engage in the exercise to determine a temporal proximity between the first exercise and the exercise.

20. The communication method according to claim 11, wherein the deep learning techniques include one or more selected from a group consisting of:
- regions with convolutional neural networks (R-CNN),
- single shot multibox detector (SSD),
- you only look once single-stage detector (YOLO), and
- fast regions with convolutional neural networks (Fast R-CNN).

\* \* \* \* \*